United States Patent
Lin et al.

(10) Patent No.: US 10,249,019 B2
(45) Date of Patent: Apr. 2, 2019

(54) METHOD AND APPARATUS FOR MAPPING OMNIDIRECTIONAL IMAGE TO A LAYOUT OUTPUT FORMAT

(71) Applicant: MEDIATEK INC., Hsin-Chu (TW)

(72) Inventors: Jian-Liang Lin, Su'ao Township, Yilan County (TW); Hung-Chih Lin, Caotun Township, Nantou County (TW); Chia-Ying Li, Taipei (TW); Shen-Kai Chang, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 141 days.

(21) Appl. No.: 15/585,224

(22) Filed: May 3, 2017

(65) Prior Publication Data

US 2017/0323423 A1 Nov. 9, 2017

Related U.S. Application Data

(60) Provisional application No. 62/356,571, filed on Jun. 30, 2016, provisional application No. 62/332,505, filed on May 6, 2016.

(51) Int. Cl.
*G06T 3/00* (2006.01)
*H04N 13/139* (2018.01)
(Continued)

(52) U.S. Cl.
CPC .......... *G06T 3/0062* (2013.01); *G06T 3/0087* (2013.01); *H04N 13/139* (2018.05);
(Continued)

(58) Field of Classification Search
CPC ..... G06T 3/0062; H04N 13/139; H04N 19/88
See application file for complete search history.

(56) References Cited

U.S. PATENT DOCUMENTS

| 7,483,590 B2 | 1/2009 | Nielsen et al. |
| 2010/0001997 A1* | 1/2010 | Kajikawa ............... G06T 17/20 345/419 |
| 2010/0208032 A1 | 8/2010 | Kweon |

FOREIGN PATENT DOCUMENTS

| CN | 1491403 A | 4/2004 |
| CN | 103873773 A | 6/2014 |

(Continued)

OTHER PUBLICATIONS

Wang, W., et al.; "Scene depth estimation of omni-directional stereo imaging system;" Computer Engineering and Applications; Dec. 2009; pp. 161-164.

(Continued)

*Primary Examiner* — Nam D Pham
(74) *Attorney, Agent, or Firm* — McClure, Qualey & Rodack, LLP

(57) ABSTRACT

Methods and apparatus of processing omnidirectional images are disclosed. According to one method, a current set of omnidirectional images converted from each spherical image in a 360-degree panoramic video sequence using a selected projection format is received, where the selected projection format belongs to a projection format group comprising a cubicface format, and the current set of omnidirectional images with the cubicface format consists of six cubic faces. If the selected projection format corresponds to the cubicface format, one or more mapping syntax elements to map the current set of omnidirectional images into a current cubemap image are signaled. The coded data are then provided in a bitstream including said one or more mapping syntax elements for the current set of omnidirectional images.

19 Claims, 15 Drawing Sheets

(51) Int. Cl.
*H04N 19/70* (2014.01)
*H04N 19/597* (2014.01)
*H04N 19/88* (2014.01)

(52) U.S. Cl.
CPC .......... *H04N 19/597* (2014.11); *H04N 19/70* (2014.11); *H04N 19/88* (2014.11)

(56) References Cited

FOREIGN PATENT DOCUMENTS

| | | |
|---|---|---|
| JP | 2002262158 A | 9/2002 |
| TW | I521953 B | 2/2016 |
| TW | I535271 B | 5/2016 |
| WO | WO 2015/128801 A2 | 9/2015 |

OTHER PUBLICATIONS

English language abstract of "Scene depth estimation of omni-directional stereo imaging system" (p. 1 of publication).

Lin, J.L., et al.; "CE1 Summary Report on Improved Depth Coding;" Joint Collaborative Team on 3D Video Coding Extensions of ITU-T SG 16 WP 3 and ISO/IEC JTC 1/SC 29/ WG 11; Feb. 2015; pp. 1-4.

Tech, G., et al.; "Overview of the Multiview and 3D Extensions of High Efficiency Video Coding;" IEEE Transactions on Circuits and Systems for Video Technology; vol. 26; No. 1; Jan. 2016; pp. 35-49.

Merkle, P., et al.; "Efficient Prediction Structures for Multiview Video Coding;" IEEE Transactions on Circuits and Systems for Video Technology; vol. 17; No. 11; Nov. 2007; pp. 1461-1473.

\* cited by examiner

METHOD AND APPARATUS FOR MAPPING OMNIDIRECTIONAL IMAGE TO A LAYOUT OUTPUT FORMAT

CROSS REFERENCE TO RELATED APPLICATIONS

The present invention claims priority to U.S. Provisional Patent Application, Ser. No. 62/332,505, filed on May 6, 2016 and U.S. Provisional Patent Application, Ser. No. 62/356,571, filed on Jun. 30, 2016. The U.S. Provisional Patent Applications are hereby incorporated by reference in their entireties.

FIELD OF THE INVENTION

The present invention relates to 360-degree video. In particular, the present invention relates to mapping a set of omnidirectional images converted from each spherical image in a 360-degree panoramic video sequence using a selected projection format into an output format.

BACKGROUND AND RELATED ART

The advances of digital video coding standards have resulted in successes of multimedia systems such as smartphones, digital TVs, and digital cameras for the past decade. After standardization activities of H.261, MPEG-1, MPEG-2, H.263, MPEG-4, and H.264/AVC, the demand for improving video compression performance has been still strong due to requirements of larger picture resolutions, higher frame rates, and better video qualities. Therefore, development of new video coding techniques for better coding efficiency than H.264/AVC has been never ending. HEVC is based on a hybrid block-based motion-compensated transform coding architecture.

Three-dimensional (3D) television has been a technology trend in recent years that intends to bring viewers sensational viewing experience. Various technologies have been developed to enable 3D viewing and the multi-view video is a key technology for 3D TV application among others. For example, the video can be a two-dimensional (2D) medium that only provides viewers a single view of a scene from the perspective of the camera. However, the multi-view video is capable of offering arbitrary viewpoints of dynamic scenes and provides viewers the sensation of realism. 3D video formats may also include depth maps associated with corresponding texture pictures. The depth maps also have to be coded to render three-dimensional view or multi-view. Due to the strong demand of improving the coding efficiency of 3D and multi-view videos caused by the requirements of coding multiple view data, larger picture resolution and better quality, various techniques have been proposed.

As an extension to HEVC and a next generation 3D video coding standard, the standardization of 3D-HEVC video coding standard was formally launched by the Joint Collaborative Team on 3D Video Coding Extension Development (JCT-3V) in July 2012 and is finalized after the 11th JCT-3V meeting held in February 2015. In order to support the auto-stereoscopic multi-view display more practically, multi-view video plus depth (MVD) format has been introduced as a new 3D video format for 3D-HEVC. The MVD format consists of a texture picture and its associated depth map. Unlike a texture picture representing the luminance and chrominance information of an object, a depth map is an image containing information relating to the distance of the objects from the camera-captured plane and is generally employed for virtual view rendering as non-visual information.

Virtual reality (VR) with head-mounted displays (HMDs) is associated with varieties of applications. The ability to show wide field of view content to a user can be used to provide immersive visual experiences. A real-world environment has to be captured in all directions resulting in an omnidirectional video corresponding to a viewing sphere. With advances in camera rigs and HMDs, the delivery of VR contents may soon become the bottleneck due to the high bitrate required for representing such content. Since the omnidirectional videos are often with 4K or higher resolution, compression is critical to reduce the bitrate. The omnidirectional videos provided are equirectangular projection. FIG. 1 illustrates an example of an image of an omnidirectional video (known as "Hangpai_2") in the equirectangular projection format. While the original image is in full color, a black and white version is shown in FIG. 1 since the black and white image is sufficient to illustrate the present invention.

The equirectangular format can be converted into different formats as shown in FIG. 2: (a) cubemap, (b) Cubemap_32, (c) Cubemap_180, (d) Plane_poles, (e) Plane_p-oles_6, (f) Plane_poles_cubemap, (g) Plane_cubemap, (h) Plane_cubemap_32, (i) Flat_fixed, (j) 180 degree 3D video (i.e., 180-3D) and (k) Cylindermap/Cylindrical. Images in FIG. 2a through FIG. 2i are based on the image in FIG. 1.

FIG. 3 illustrates an example of converting the equirectangular projection format into a cubic format using projection conversion 310, where images labelled from 1 to 6 correspond to images on six faces of a cubic for representing a 360-degree video. Four commonly used layouts (i.e., 1×6-layout 410, 2×3-layout 420, 3×2-layout 430, and 6×1-layout 440) are illustrated in FIG. 4. In each layout, the images from 6 faces are assembled into one single rectangular image. FIG. 5 illustrates the geometry comparison between the equirectangular format and the cubic format. Equirectangular geometry 510 and cubic geometry 520 are shown in FIG. 5. Image 512 is an example of equirectangular format and image 522 is an example of cubic format.

In the existing approach for converting cubic faces into an output format, a same selected output layout format is always used and the six faces are assigned to the output layout format in a fixed manner. While the fixed mapping is simple, it prevents a user from using other layout format to meet the user's needs. Furthermore, after the cubic faces are converted to an output layout format, the converted output images are often compressed to reduce the required space. The selected output layout format and the fixed mapping may not be efficient for compression.

BRIEF SUMMARY OF THE INVENTION

Methods and apparatus of processing omnidirectional images are disclosed. According to one method, a current set of omnidirectional images converted from each spherical image in a 360-degree panoramic video sequence using a selected projection format is received, where the selected projection format belongs to a projection format group comprising a cubicface format, and the current set of omnidirectional images with the cubicface format consists of six cubic faces. If the selected projection format corresponds to the cubicface format, one or more mapping syntax elements to map the current set of omnidirectional images into a current cubemap image are signaled. The coded data are then provided in a bitstream including said one or more mapping syntax elements for the current set of omnidirectional images.

The projection format group may further comprise an equirectangular format, a 180-3D format and a cylindermap format. If the current set of omnidirectional images is in the equirectangular format, the current set of omnidirectional images is converted into the cubicface format and said the mapping syntax elements are signaled for the converted current set of omnidirectional images by treating the converted current set of omnidirectional images as having the cubicface format.

The mapping syntax elements may comprise a current cubic type associated with the current cubemap image and the current cubic type belongs to a current output layout format set consisting of 1×6 cubemap layout, 2×3 cubemap layout, 3×2 cubemap layout, and 6×1 cubemap layout. The mapping syntax elements may further comprise layout mapping indices, where each layout mapping index associates one cubic face of the current set of omnidirectional images with one location of the current cubemap image. One layout mapping index can be signaled for each cubic face of the current set of omnidirectional images except for the last cubic face of the current set of omnidirectional images. Each layout mapping index can be coded using a code table with a number of entries equal to a number of remaining cubic faces to be mapped. In another embodiment, each layout mapping index is coded using a code table with a number of entries equal to a number of cubic faces to be mapped.

In another embodiment, the mapping syntax elements may further comprise rotation indices, where each rotation index indicates a rotation angle for one cubic face of the current set of omnidirectional images at one location of the current cubemap image. One rotation index can be signaled for each cubic face of the current set of omnidirectional images. Each rotation index is coded using code table to indicate one rotation angle selected from a rotation angle set corresponding to {0° and 90° }, {0°, +90°, −90° and 180° } or {0°, 90°, 180° and 270° }.

The mapping syntax elements further comprise a default layout flag to indicate whether a default cubemap image is used for the current set of omnidirectional images with the current cubic type, and wherein the layout mapping indices and the rotation indices are signaled for the current set of omnidirectional images only if the default layout flag indicates that the default cubemap image is not used for the current set of omnidirectional images. If the default layout flag indicated that the default cubemap image is used for the current set of omnidirectional images, default layout mapping indices and default rotation indices are used for the current set of omnidirectional images.

The output layout format set used for the current set of omnidirectional images can be signaled at a sequence level, view level, picture level, slice level, sequence parameter set (SPS), video parameter set (VPS), or application parameter set (APS) in a bitstream for the 360-degree panoramic video sequence. The mapping syntax elements can be signaled at a sequence level, view level, picture level, slice level, SPS, VPS, or APS in the bitstream for the 360-degree panoramic video sequence.

The mapping syntax elements can be signaled predictively based on one or more reference mapping syntax elements. In one embodiment, multiple sets of one or more reference mapping syntax elements are signaled at a sequence level, view level or picture level in the bitstream for the 360-degree panoramic video sequence and a flag is signaled in a slice level or the picture level to select the mapping syntax elements from the multiple sets of one or more reference mapping syntax elements for the current set of omnidirectional images. In another embodiment, the reference mapping syntax elements may be predicted by one or more first mapping syntax elements from a previous picture, slice or frame.

BRIEF DESCRIPTION OF THE DRAWINGS

FIG. 2k Cylindermap/Cylindrical.

FIGS. 16a-FIG. 16d illustrate examples of other predefined layout for: FIG. 16a different cubic 6×1 layout, FIG. 16b different cubic 3×2 layout, FIG. 16c different cubic 2×3 layout, and FIG. 16b different cubic 1×6 layout.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In one aspect of the present invention, a set of different output layouts are predefined and an explicit flag is transmitted in the bitstream at the sequence level, view level, picture level, slice level, sequence parameter set (SPS), video parameter set (VPS), or application parameter set (APS) to select the output layout from the set of different output layouts. For example, the set of different output layouts may include at least two output layout formats selected from a group comprising of cubemap layout, cubemap_32 layout, cubemap_180 layout, plane_poles layout, plane_poles _6 layout, plane_poles_cubemap layout, plane_cubemap layout, plane_cubemap_32 layout, flat_fixed layout, cubemap_1×6 layout, cubemap_2×3 layout, cubemap_3×2 layout and cubmap_6×1 layout.

In another example, the set of output layout formatss only includes cubemap_1×6 layout, cubemap_2×3 layout, cubemap_3×2 layout, and cubmap_6×1 layout. A flag is transmitted to select the output layout among cubemap_1×6 layout, cubemap_2×3 layout, cubemap_3×2 layout, and cubmap_6×1 layout.

Figure 1:
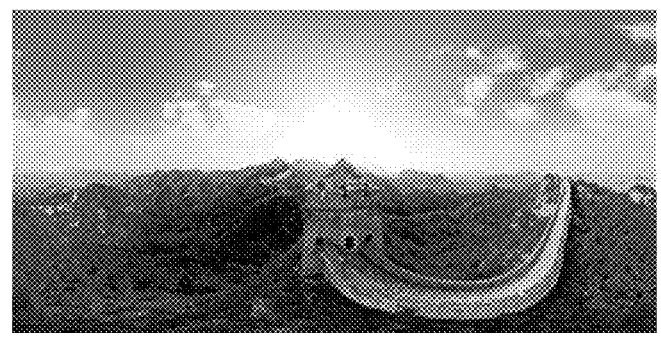
FIG. 1 illustrates an example of an image of an omnidirectional video (known as "Hangpai_2") in the equirectangular projection format.
Figure 2A:
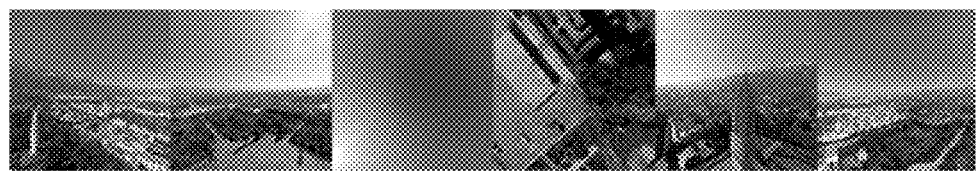
FIGS. 2a-2k illustrate various examples of output layout formats including FIG. 2a cubemap, FIG. 2b Cubemap_32, FIG. 2c Cubemap_180, FIG. 2d Plane_poles, FIG. 2e Plane_poles_6, FIG. 2f Plane_poles_cubemap, FIG. 2g Plane_cubemap, FIG. 2h Plane_cubemap_32, FIG. 2i Flat_fixed, FIG. 2j 180 degree 3D video (i.e., 180-3D)
Figure 2B:
Figure 2C:
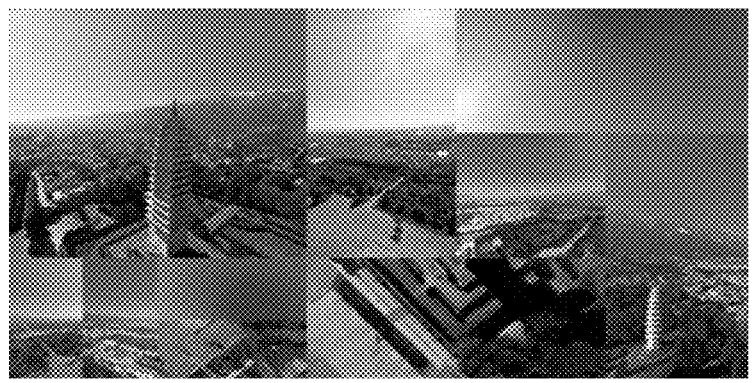
Figure 2D:
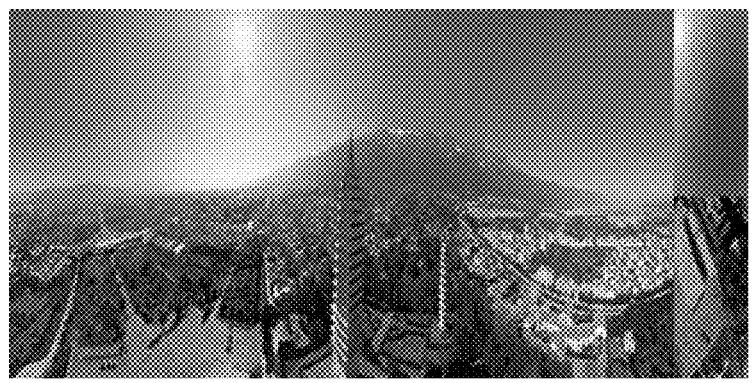
Figure 2E:
Figure 2F:
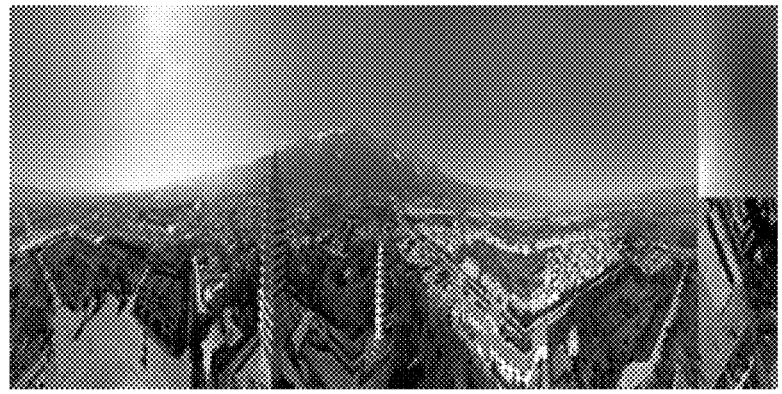
Figure 2G:
Figure 2H:
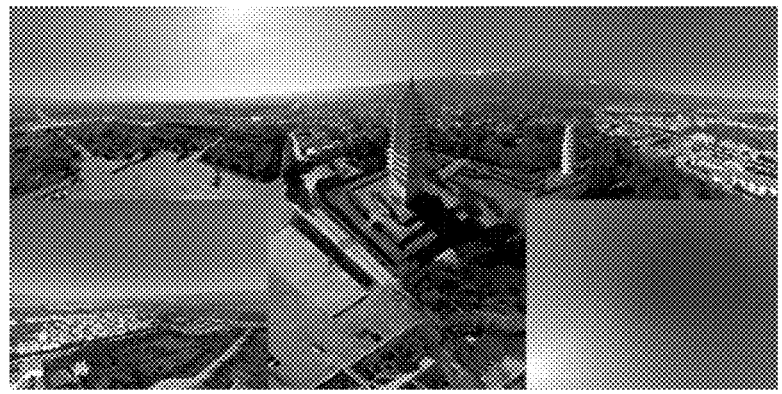
Figure 2I:
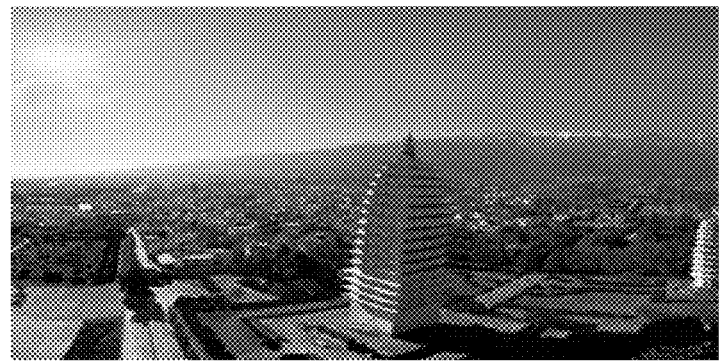
Figure 2J:
Figure 2K:
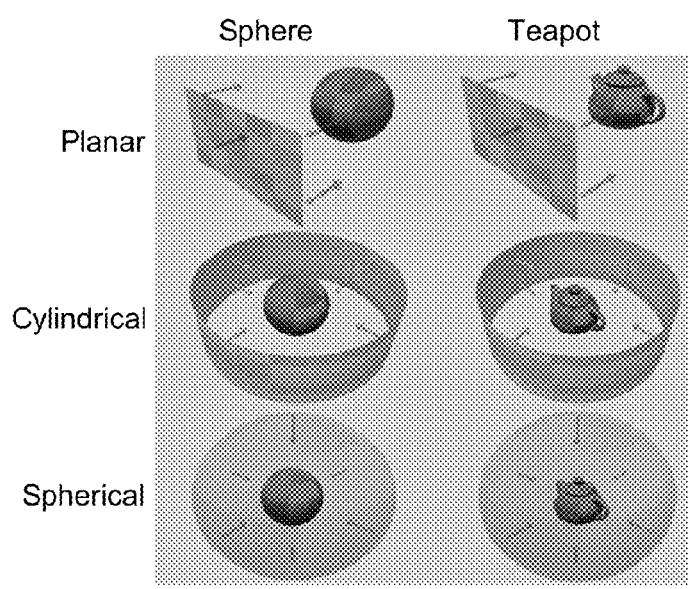
Figure 3:
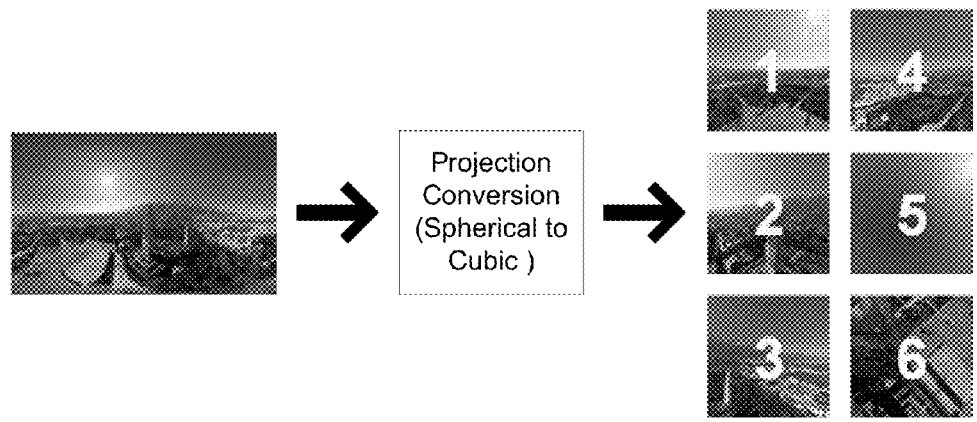
FIG. 3 illustrates an example of converting the equirectangular projection format into a Cubic format using projection conversion, where images labelled from 1 to 6 correspond to images on six faces of a cubic for representing a 360-degree video.
Figure 4:
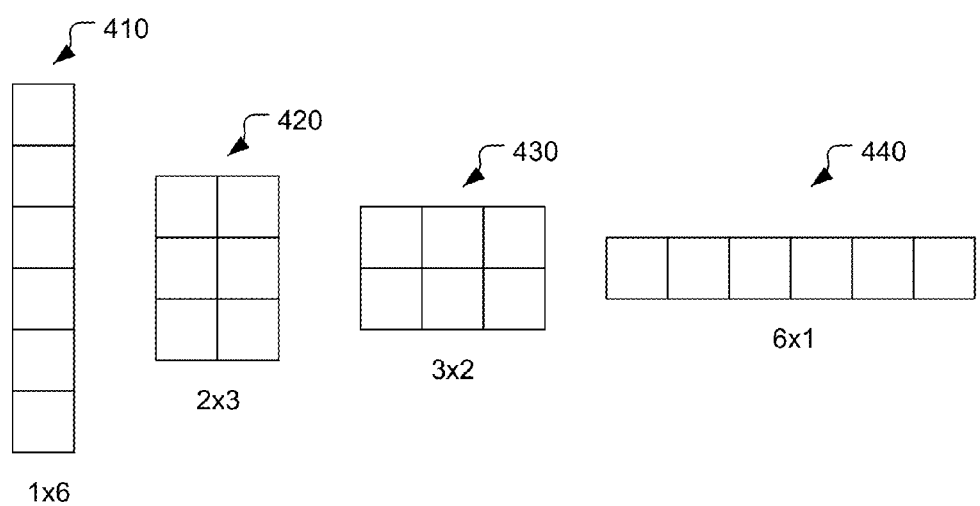
FIG. 4 illustrates four commonly used layouts: 1×6-layout, 2×3-layout, 3×2-layout and 6×1-layout.
Figure 5:
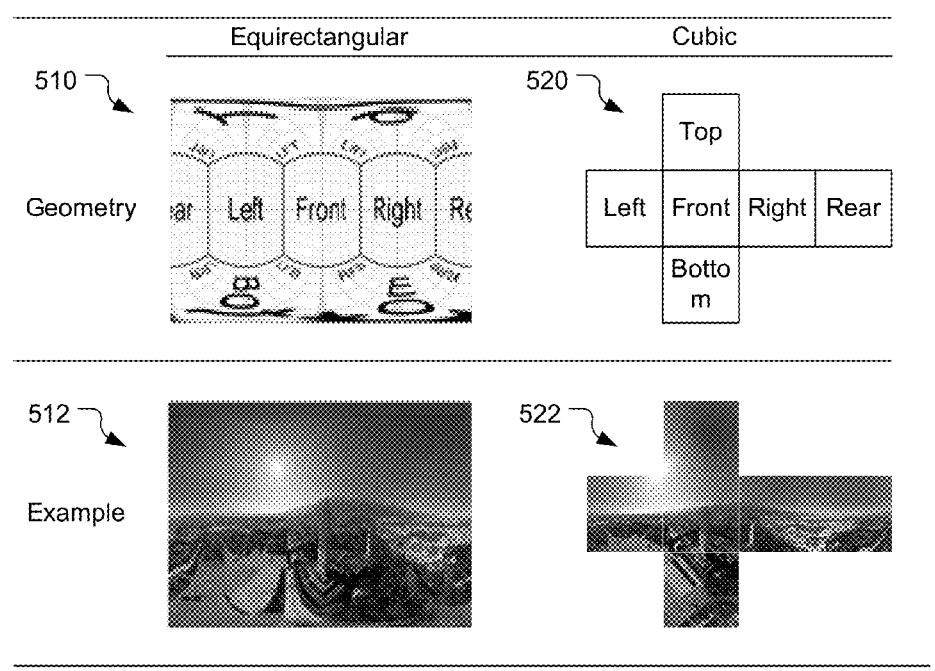
FIG. 5 illustrates the geometry comparison between the equirectangular format and the cubic format.
Figure 6:
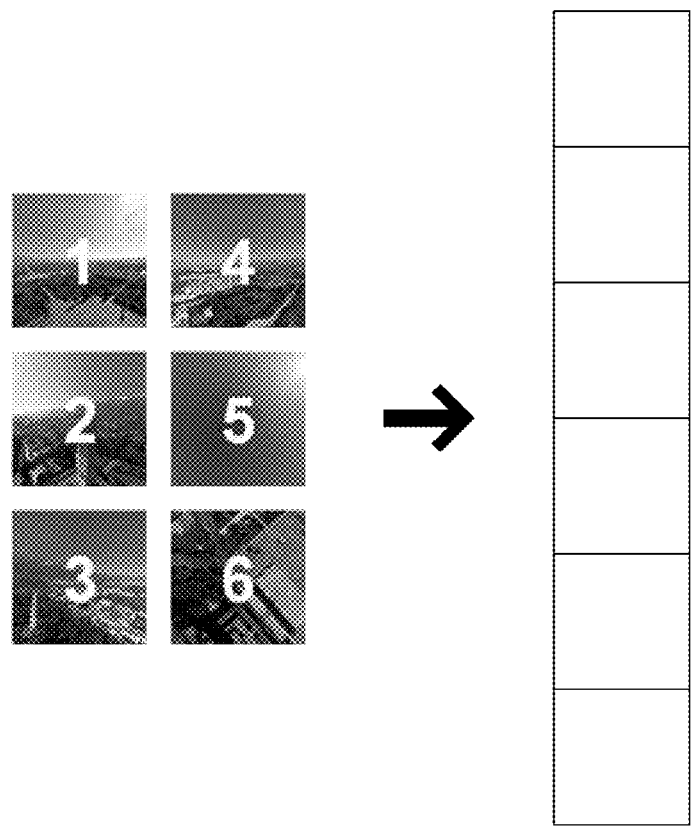
FIG. 6 illustrates an example of mapping the six cubic faces to 1×6-layout.
Figure 7:
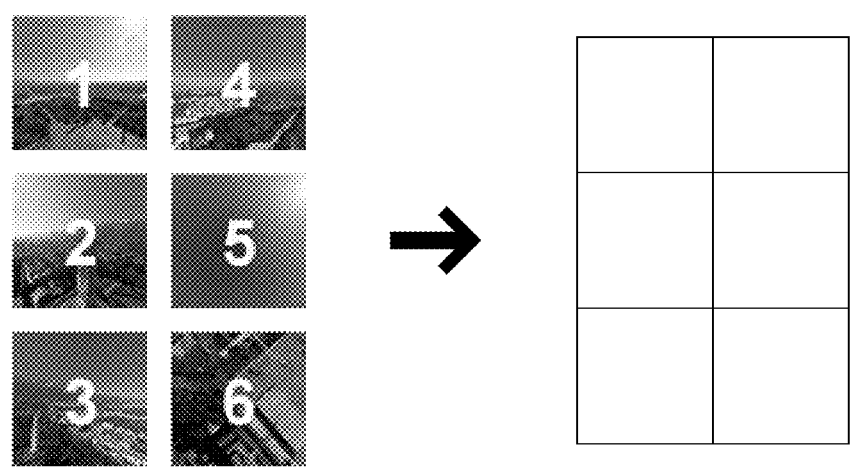
FIG. 7 illustrates an example of mapping the six cubic faces to 2×3-layout.

FIG. 6 and FIG. 7 illustrate an example of mapping the six cubic faces to two possible layouts, where the six cubic faces are mapped to 1×6-layout in FIG. 6 and the six cubic faces are mapped to 2×3-layout in FIG. 7.

Figure 8B:
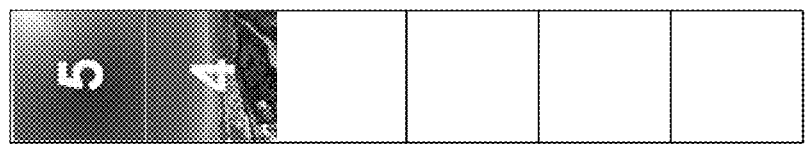
FIGS. 8a, 8b, and 8c illustrate an example of mapping six cubic faces to 1×6-layout, where FIG. 8a face #5 is assigned to the first position of the layout in step 1, FIG. 8b face #4 is assigned to the second position of the layout in step 2, and (c) face #6 is assigned to the third position of the layout in step 3.
Figure 8B:
Figure 8B:
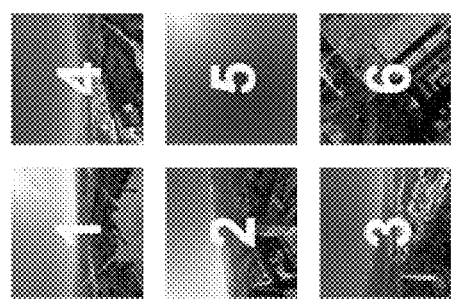
Figure 8A:
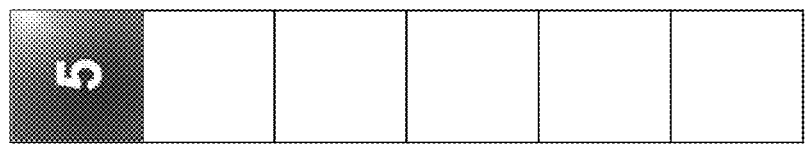
Figure 8A:
Figure 8A:
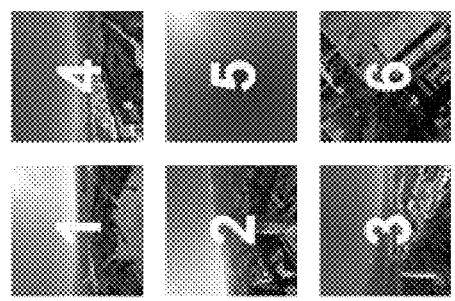

According to one method of the present invention, the six cubic faces can be assigned to a possible layout according to the following steps:

Step 1: Transmit (at an encoder side)/receive (at a decoder side) a flag to assign one of the six cubic faces to a first position in the layout. FIG. 8a shows an example of assigning face #5 to the first position of the 1×6 layout.

Step 2: Transmit/receive a flag to assign one of the remaining five cubic faces to a second position in the layout. FIG. 8b shows an example of assigning face #4 to the second position of the 1×6 layout.

Figure 8C:
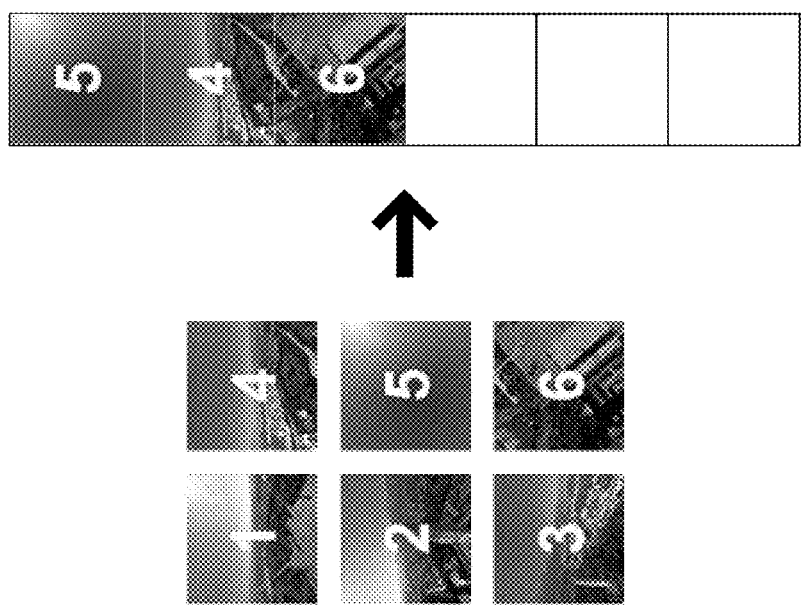

Step 3: Transmit/receive a flag to assign one of the remaining four cubic faces to a third position in the layout. FIG. 8c shows an example of assigning face #6 to the third position of the 1×6 layout.

Step 4: Transmit/receive a flag to assign one of the remaining three cubic faces to a fourth position in the layout.

Step 5: Transmit/receive a flag to assign one of the remaining two cubic faces to a fifth position in the layout.

Step 6: Assign the last remaining face to the final position in the layout. No need to signal the flag for the last one since there is only one remaining cubic face.

In the above proposed method, the flag can be transmitted using a truncated unary code as illustrated in Table 1. In step 1, a first flag is encoded using the truncated unary code with size 6 to select one of the six cubic faces. In step 2, a second flag is encoded using the truncated unary code with size 5 to select one of the five remaining cubic faces, and so on.

TABLE 1

| n (non-negative) | n (strictly positive) | Truncated Unary code | Alternative |
| --- | --- | --- | --- |
| 0 | 1 | 0 | 1 |
| 1 | 2 | 10 | 01 |
| 2 | 3 | 110 | 001 |
| 3 | 4 | 1110 | 0001 |
| 4 | 5 | 11110 | 00001 |
| 5 | 6 | 11111 | 00000 |

In another embodiment, the rotation of the face is also defined for mapping a cubic face to one output layout. For example, the six cubic faces are assigned to the possible layouts according to the following steps:

Step 1: Transmit (at an encoder side)/receive (at a decoder side) a flag to assign one of the six cubic faces to a first position in the layout. Transmit/receive another flag to define the rotation of that selected face.

Step n (n from 2 to 5): Transmit/receive a flag to assign one of the remaining (6-n+1) cubic faces to the $n^{th}$ position in the layout. Transmit/receive another flag to define the rotation of the selected face.

Step 6: Assign the last remaining face to the final position in the layout. Transmit/receive another flag to define the rotation of that selected face.

The rotation of those six faces can also be transmitted after the six faces are assigned as illustrated in the following step:

Step 1-a: Transmit (at an encoder side)/receive (at a decoder side) a flag to assign one of the six cubic faces to a first position in the layout.

Step n-a (n from 2 to 5): Transmit/receive a flag to assign one of the remaining (6-n+1) cubic faces to the $n^{th}$ position in the layout.

Step 6-a: Assign the last remaining face to the final position in the layout.

Step n-b (n from 1 to 6): Transmit/receive a flag to define the rotation of the $n^{th}$ face.

On the other hand, the assignment of the face and the rotation of that face can also be combined as one flag as illustrated in the following steps:

Step 1: Transmit (at an encoder side)/receive (at a decoder side) a flag to assign one of the six cubic faces and it's rotation to a first position in the layout.

Step n (n from 2 to 5): Transmit/receive a flag to assign one of the remaining (6-n+1) cubic faces and it's rotation to the $n^{th}$ position in the layout.

Step 6: Assign the last remaining face to the final position in the layout. Transmit/receive a flag to define the rotation of the sixth face.

The rotation of the face can be is selected from the set {0 degree, 90 degree}. In another embodiment, the rotation of the face can also be selected from the set {0 degree, 90 degree, 180 degree, and 270 degree} or {0 degree, 90 degree, −90 degree, 180 degree}. For example, in step 4, a flag is transmitted or received to assign cubic face #1 with rotation to the fourth position in the layout. In this example, after steps 1 through 3, the remaining faces are {face#1, face#2, and face#3}. Based on the following truncated unary table, index 0 (non-negative)/ index 1 (strictly positive) is transmitted with code "0" to assign face #1 to the fourth position shown in Table 2 and rotation code "10" shown in Table 3 (or rotation code "1" shown in Table 4) to define −90 degree rotation.

TABLE 2

| n (non-negative) | n (strictly positive) | Truncated Unary code | Alternative |
|---|---|---|---|
| 0 | 1 | 0 | 1 |
| 1 | 2 | 10 | 01 |
| 2 | 3 | 11 | 00 |

TABLE 3

| n (non-negative) | Rotation degree Type 1 | Truncated Unary code | Alternative |
|---|---|---|---|
| 0 | 0 degree | 0 | 1 |
| 1 | −90 degree | 10 | 01 |
| 2 | +90 degree | 110 | 001 |
| 3 | +180 degree | 111 | 000 |

TABLE 4

| n (non-negative) | Rotation degree Type 1 | Truncated Unary code | Alternative |
|---|---|---|---|
| 0 | 0 degree | 0 | 1 |
| 1 | −90 degree | 1 | 0 |

Figure 9:
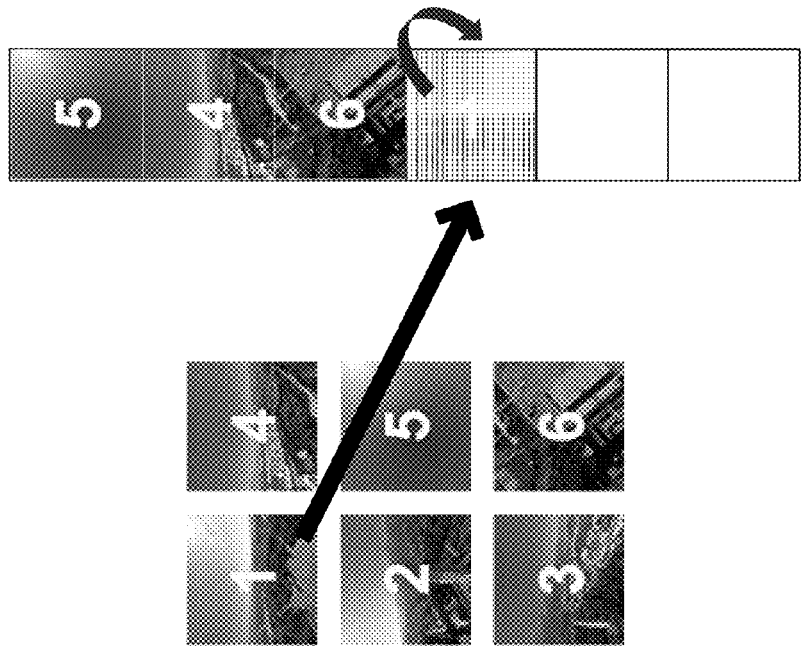
FIG. 9 illustrates an example of mapping six cubic faces to 1×6-layout, where cubic face #1 is assigned with (−90 degree rotation) to the fourth position in the output layout.

FIG. 9 illustrates an example of assigning cubic face #1 with (−90 degree rotation) to the fourth position in the layout.

The above proposed method to signal the equirectangular format to the layout can be transmitted in the bitstream at the sequence level, view level, picture level, slice level, SPS (sequence parameter set), VPS (video parameter set), or APS (adaptation parameter set) level. In another embodiment, N sets of the mapping formats for the equirectangular to the output layout is signaled in the sequence level, view level, picture level, SPS, VPS, or APS as shown below:

Mapping Format:
  Index 1: {face#1 (rotation degree), face#2 (rotation degree), face#3 (rotation degree), face#4 (rotation degree), face#5 (rotation degree), face#6 (rotation degree)}
  Index 2: {face#1 (rotation degree), face#2 (rotation degree), face#3 (rotation degree), face#5 (rotation degree), face#4 (rotation degree), face#6 (rotation degree)}
  Index N: {face#2 (rotation degree), face#3 (rotation degree), face#1 (rotation degree), face#5 (rotation degree), face#4 (rotation degree), face#6 (rotation degree)}

A flag is then further transmitted in the slice or picture level to select one mapping format from {Index 1, Index 2, . . . , Index N}.

In another embodiment, the mapping format can be predicted from another mapping format. For example, the following reference mapping format can be chosen from the N sets of mapping formats transmitted in the sequence level, view level, or picture level. In yet another embodiment, the mapping format from the previous picture/slice/frame can be used as the reference mapping format to predict the current mapping format. The reference mapping format {face#1, face#2, face#3, face#4, face#5, face#6} is known and used to predict the current mapping format.

Assume the target mapping format is {face#1, face#2, face#4, face#3, face#5, face#6}, to predict the target mapping format from {face#1, face#2, face#3, face#4, face#5, face#6}, the prediction algorithm can be illustrated as follows:

Step 1: The remaining faces following the orders are: {face#1, face#2, face#3, face#4, face#5, face#6}. Index 0 is transmitted to selected face#1 into the first position in the layout {face#1, - - -, - - -, - - -, - - -, - - -}.

Step 2: The remaining faces following the orders are: {face#2, face#3, face#4, face#5, face#6}. Index 0 is transmitted to selected face#2 into the second position in the layout {face#1, face#2, - - -, - - -, - - -, - - -}.

Step 3: The remaining faces following the orders are: {face#3, face#4, face#5, face#6}. Index 1 is transmitted to selected face#4 into the third position in the layout {face#1, face#2, face#4, - - -, - - -, - - -}.

Step 4: The remaining faces following the orders are: {face#3, face#5, face#6}. Index 0 is transmitted to selected face#3 into the fourth position in the layout {face#1, face#2, face#4, face#3, - - -, - - -}.

Step 5: The remaining faces following the orders are: {face#5, face#6}. Index 0 is transmitted to selected face#5 into the fifth position in the layout { face#1, face#2, face#4, face#3, face#5, - - -}.

Step 6: The remaining face is {face#6} and is chosen as the last position in the layout {face#1, face#2, face#4, face#3, face#5, face#6}.

Figure 10:
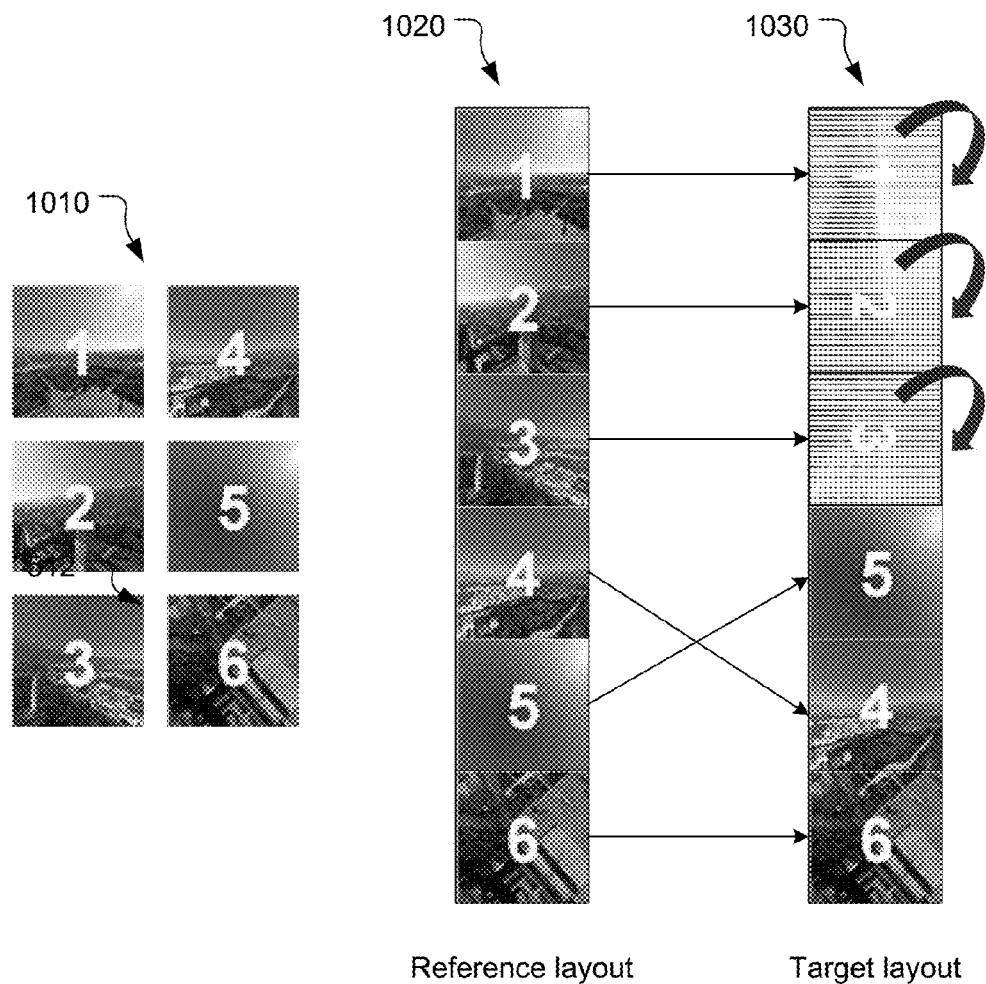
FIG. 10 illustrates an example of rotation prediction, where the reference output layout is used to predict the target output layout.

The rotation can also be predicted from the reference layout. FIG. 10 illustrates an example of rotation prediction, where image 1010 corresponds to six cubic faces, image 1020 corresponds to reference layout and image 1030 corresponds to the target layout. In FIG. 10, the first three positions in the target layout are rotated.

In the above example, the following steps can be applied to predict the target layout from the reference layout. In this example, the reference layout is {face#1 (0), face#2 (0), face#3 (0), face#4 (0), face#5 (0), face#6 (0)} and the target layout is {face#1 (−90), face#2 (−90), face#3 (−90), face#5 (0), face#4 (0), face#6 (0)} where (0) denotes 0 degree and (−90) denotes −90 degree.

Step 1: The remaining faces following the orders are: {face#1 (0), face#2 (0), face#3 (0), face#4 (0), face#5 (0), face#6 (0)}. Index 0 is transmitted to selected face#1 into the first position in the layout {face#1, - - -, - - -, - - -, - - -, - - -}. The truncated unary code with size 6 as shown in Table 5 can be used to code Index 0, where the row of selected code is indicated in bold Italic font. The difference of the degree (−90) is further transmitted and the final degree is reconstructed as: reference degree+difference of the degree=(0)+(−90)=(−90). The difference of the degree (−90) can be coded using either the rotation code Type 1 in Table 6 or the rotation code Type 2 (Table 4) in Table 7, where the row of selected code is indicated in bold Italic font.

TABLE 5

| n (non-negative) | n (strictly positive) | Truncated Unary code | Alternative |
|---|---|---|---|
| *0* | *1* | *0* | *1* |
| 1 | 2 | 10 | 01 |
| 2 | 3 | 110 | 001 |
| 3 | 4 | 1110 | 0001 |
| 4 | 5 | 11110 | 00001 |
| 5 | 6 | 11111 | 00000 |

TABLE 6

| n (non-negative) | Rotation degree Type 1 | Truncated Unary code | Alternative |
|---|---|---|---|
| 0 | 0 degree | 0 | 1 |
| *1* | *−90 degree* | *10* | *01* |

TABLE 6-continued

| n (non-negative) | Rotation degree Type 1 | Truncated Unary code | Alternative |
|---|---|---|---|
| 2 | +90 degree | 110 | 001 |
| 3 | +180 degree | 111 | 000 |

TABLE 7

| n (non-negative) | Rotation degree Type 1 | Truncated Unary code | Alternative |
|---|---|---|---|
| 0 | 0 degree | 0 | 1 |
| *1* | *−90 degree* | *1* | *0* |

Step 2: The remaining faces following the orders are: {face#2 (0), face#3 (0), face#4 (0), face#5 (0), face#6 (0)}. Index 0 is transmitted to selected face#2 into the second position in the layout {face#1, face#2, - - -, - - -, - - -, - - -}. The difference of the degree (−90) is further transmitted. In this case, a truncated unary code with size 5 as shown in Table 8 can be used to code Index 0, where the row of selected code is indicated in bold Italic font.

TABLE 8

| n (non-negative) | n (strictly positive) | Truncated Unary code | Alternative |
|---|---|---|---|
| *0* | *1* | *0* | *1* |
| 1 | 2 | 10 | 01 |
| 2 | 3 | 110 | 001 |
| 3 | 4 | 1110 | 0001 |
| 4 | 5 | 1111 | 0000 |

Step 3: The remaining faces following the orders are: {face#3 (0), face#4 (0), face#5 (0), face#6 (0)}. Index 0 is transmitted to selected face#3 into the third position in the layout {face#1, face#2, face#3, - - -, - - -, - - -}. The difference of the degree (−90) is further transmitted. In this case, a truncated unary code with size 4 as shown in Table 9 can be used to code Index 0, where the row of selected code is indicated in bold Italic font.

TABLE 9

| n (non-negative) | n (strictly positive) | Truncated Unary code | Alternative |
|---|---|---|---|
| *0* | *1* | *0* | *1* |
| 1 | 2 | 10 | 01 |
| 2 | 3 | 110 | 001 |
| 3 | 4 | 111 | 000 |

Step 4: The remaining faces following the orders are: {face#4 (0), face#5 (0), face#6 (0)}. Index 1 is transmitted to selected face#5 into the fourth position in the layout {face#1, face#2, face#3, face#5, - - -, - - -}. The difference of the degree (0) is further transmitted. In this case, a truncated unary code with size 3 as shown in Table 10 can be used to code Index 1, where the row of selected code is indicated in bold Italic font.

TABLE 10

| n (non-negative) | n (strictly positive) | Truncated Unary code | Alternative |
|---|---|---|---|
| 0 | 1 | 0 | 1 |
| *1* | *2* | *10* | *01* |
| 2 | 3 | 11 | 00 |

Step 5: The remaining faces following the orders are: {face#4 (0), face#6 (0)}. Index 0 is transmitted to selected face#4 into the fifth position in the layout { face#1, face#2, face#3, face#5, face#4, - - - }. The difference of the degree (0) is further transmitted. In this case, a truncated unary code with size 2 as shown in Table 11 can be used to code Index 0, where the row of selected code is indicated in bold Italic font.

TABLE 11

| n (non-negative) | n (strictly positive) | Truncated Unary code | Alternative |
|---|---|---|---|
| *0* | *1* | *0* | *1* |
| 1 | 2 | 1 | 0 |

Step 6: The remaining face is {face#6} and is chosen as the last position in the layout {face#1, face#2, face#4, face#3, face#5, face#6}. The difference of the degree (0) is further transmitted.

For example, an index can be first transmitted in the picture/slice/frame level to select one mapping layout as the reference layout. The prediction method is then further applied to predict the target layout for current picture/slice/frame from the reference layout. In another example, the reference layout can be inherited from the previous coded picture/slice/frame and the prediction method is then applied to predict the target layout for current picture/slice/frame.

In the above proposed methods, the truncated unary code can also be replaced by other entropy coding method. For example, one of the following entropy coding methods can be applied in this invention.

ae(v): context-adaptive arithmetic entropy-coded syntax element.

b(8): byte having any pattern of bit string (8 bits). The parsing process for this descriptor is specified by the return value of the function read_bits(8).

f(n): fixed-pattern bit string using n bits written (from left to right) with the left bit first. The parsing process for this descriptor is specified by the return value of the function read_bits(n).

se(v): signed integer 0-th order Exp-Golomb-coded syntax element with the left bit first.

u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.

ue(v): unsigned integer 0-th order Exp-Golomb-coded syntax element with the left bit first.

An exemplary syntax design for the layout signaling according to an embodiment of the present invention is shown as follows:

TABLE 12

| | Descriptor |
|---|---|
| layout_mapping_extension( ) {<br>  ...<br>  for ( i=0; i<num_of_layout_faces−1; i++ ) {<br>    layout_face[i]<br>  }<br>  ...<br>} | <br><br><br>ue(v)<br> |

In the above syntax table, syntax num_of_layout_faces specifies the total number of faces in the layout. Syntax layout_face[i] specifies the index in the remaining (num_of_layout_faces−i) faces as the corresponding face for the i-th position in the layout, and the value of layout_face[i] shall be in the range of 0 to (num_of_layout_faces−i−1), inclusive. Syntax layout_face[num_of_layout_faces−1] is inferred to be qual to the last remaining face.

An exemplary syntax design for the layout signaling with rotation according to an embodiment of the present invention is shown as follows:

TABLE 13

| | Descriptor |
|---|---|
| layout_mapping_extension( ) {<br>  ...<br>  for ( i=0; i<num_of_layout_faces−1; i++ ) {<br>    layout_face[i]<br>    layout_rotation[i]<br>  } | <br><br><br>ue(v)<br>ue(v) |

TABLE 13-continued

| | Descriptor |
|---|---|
|     layout_rotation[num_of_layout_faces−1]<br>} | ue(v) |

In the above syntax table, syntax num_of_layout_faces specifies the index in the remaining num_of_layout_faces−i faces as the corresponding face for the i-th position in the layout, and the value of layout_face[i] shall be in the range of 0 to (num_of_layout_faces−i−1), inclusive. Syntax layout_face[num_of_layout_faces−1] is inferred to be qual to the last remaining face. Syntax layout_face[i] specifies the corresponding face rotation for the i-th position in the layout as specified in Table 14 or Table 15, and the value of layout_face[i] shall be in the range of 0 to 3 (or 1), inclusive.

TABLE 14

| layout_rotation[i] | rotation degree |
|---|---|
| 0 | 0 |
| 1 | −90 |
| 2 | +90 |
| 3 | +180 |

TABLE 15

| layout_rotation[i] | rotation degree |
|---|---|
| 0 | 0 |
| 1 | −90 |

Figure 11:
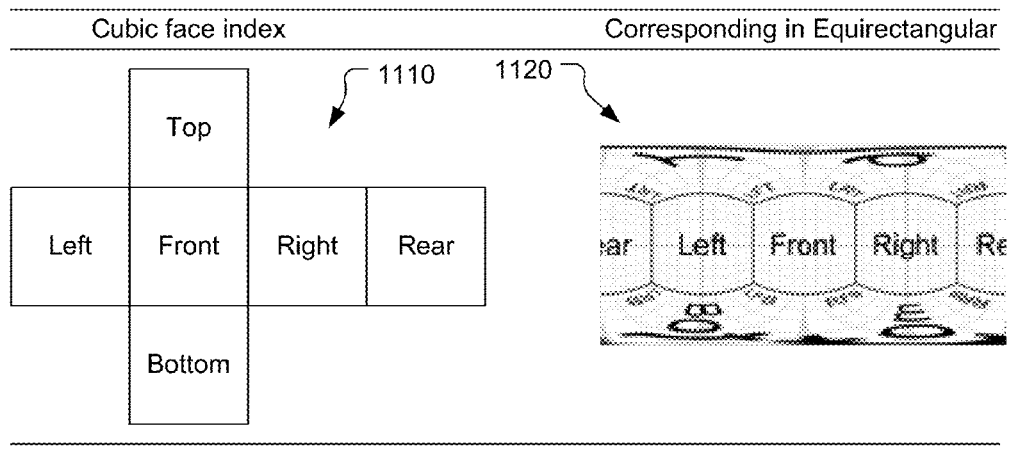
FIG. 11 illustrates an example of the designation of six cubic faces of cubic face indices and the corresponding equirectangular image.

According to another embodiment, an exemplary syntax design for the layout signaling is shown in Table 16, where additional syntax is signaled for the information of the permutation and rotation of these six cubic faces. Default relative location of cubic faces. The initial cubic face array is equal to {Left, Front, Right, Rear, Top, Bottom}. The designation of cubic face indices and corresponding equirectangular are shown in FIG. 11.

TABLE 15

| | Descriptor |
|---|---|
| Extension_data(i) {<br>  While ( next_bits(32) == extension_start_code ) {<br>    extension_start_code<br>    if(i == 0){<br>      if( next_bits(4) == '0010')<br>        sequence_display_extension( )<br>      else if ( next_bits(4) == '0011')<br>        temporal_scalability_extension( )<br>      else if ( next_bits(4) == '0100')<br>        copyright_extension( )<br>      else if ( next_bits(4) == '1010')<br>        mastering_display_and_content_metadata_extension( )<br>      else if ( next_bits(4) == '1011')<br>        camera_parameters_extension( )<br>      else if ( next_bits(4) == '1100')<br>        layout_mapping_extension( )<br>      else<br>        ... | <br><br>f(32)<br> |

TABLE 16

| | Descriptor |
|---|---|
| layout_mapping_extension( ) {<br>  num_of_layout_face_minus1<br>  for ( i=0; i<num_of_layout_face_minus1; i++ ) {<br>    layout_face[i]<br>    layout_rotation [i]<br>  }<br>  layout_rotation[num_of_layout_face_minus1]<br>} | <br>ue(v)<br><br>ue(v)<br>ue(v)<br><br>ue(v) |

In the above syntax table, num_of_layout_face_minus1 specifies the total number of faces in the layout. Syntax num_of_layout_faces is inferred to be num_of_layout_ face_minus1+1. Syntax layout_face[i] specifies the index in the remaining (num_of_layout_faces−i) faces as the corresponding face for the i-th position in the layout, and the value of layout_face[i] shall be in the range of 0 to (num_of_layout_face_minus1−i), inclusive. Syntax layout_face[num_of_layout_face_minus1] is inferred to be qual to the last remaining face. Syntax layout_rotation[i] specifies the corresponding face rotation for the i-th position in the layout as specified in Table 17, and the value of layout_rotation[i] shall be in the range of 0 to 3, inclusive.

TABLE 17

| layout_rotation[i] | rotation degree (counterclockwise) |
|---|---|
| 0 | 0 |
| 1 | −90 |
| 2 | +90 |
| 3 | +180 |

Figure 12:
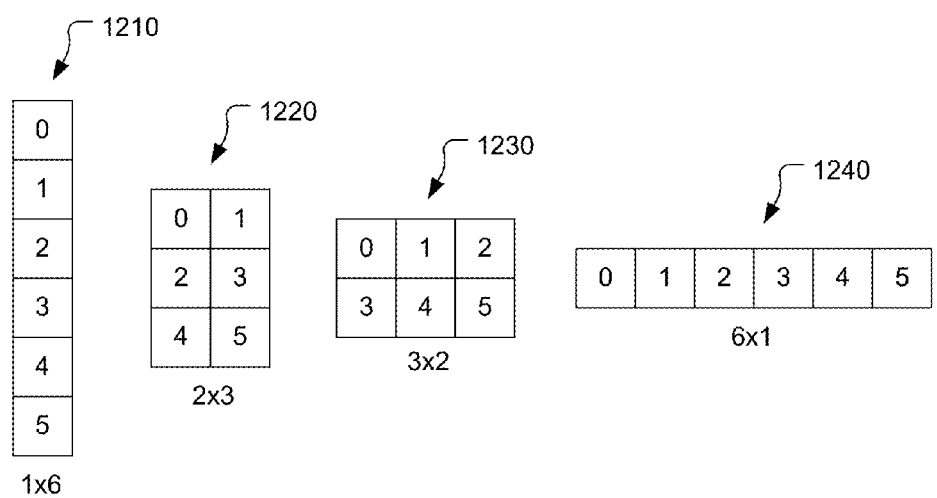
FIG. 12 illustrates an example of order of the position in each cubic layout for 1×6 layout, 2×3 layout, 3×2 layout and 6×1 layout.
Figure 13:
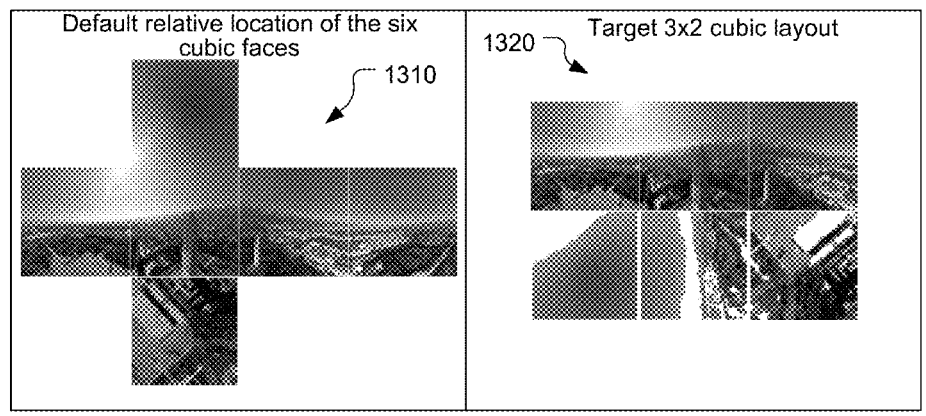
FIG. 13 illustrates an example of a default layout of the six cubic faces and a target 3×2 cubic layout.

The order of the position in each cubic layout (i.e., layout_face[i]) is shown in FIG. 12 for 1×6 layout (1210), 2×3 layout (1220), 3×2 layout (1230) and 6×1 layout (1240). FIG. 13 illustrates an example of a default layout (1310) of the six cubic faces and a target 3×2 cubic layout (1320).

An example of signaling the cubic face layout according to the above embodiment is shown in the following Table. For i=0, 1 and 2, the first three layout face selections correspond to the first positions in the list (i.e., 0 {Left}, 0 {Front} and 0 {Right}). Accordingly, index 0 is selected for i=0, 1 and 2. For i=3, the second position in the list (i.e., 1 {Top}) is selected. Accordingly, index 1 is signaled. For i=4, the first second position in the list (i.e., 0 {Rear}) is selected. Accordingly, index 0 is signaled. There is no need to signal the index for the last cubic face layout since there is only one remaining cubic face. However, layout_rotation[i] is still needed for the last cubic face (i.e., i=5).

TABLE 18

| | Step #0: num_of_layout_face_minus1 = 5 | | |
|---|---|---|---|
| Step #1 | Remaining faces in cubic face array | layout_face[i] | layout_rotation[i] |
| i = 0 | {Left(0), Front(1), Right(2), Rear(3), Top(4), Bottom(5)} | 0 {Left} | 0 |
| i = 1 | {Front(0), Right(1), Rear(2), Top(3), Bottom(4)} | 0 {Front} | 0 |
| i = 2 | {Right(0), Rear(1), Top(2), Bottom(3)} | 0 {Right} | 0 |
| i = 3 | {Rear(0), Top(1), Bottom(2)} | 1 {Top} | 1 |
| i = 4 | {Rear(0), Bottom(1)} | 0 {Rear} | 2 |

Step #2:
The last position of the layout is cubic face {Bottom} and layout_rotation[num_of_layout_face_minus1] = 1

Figure 14:
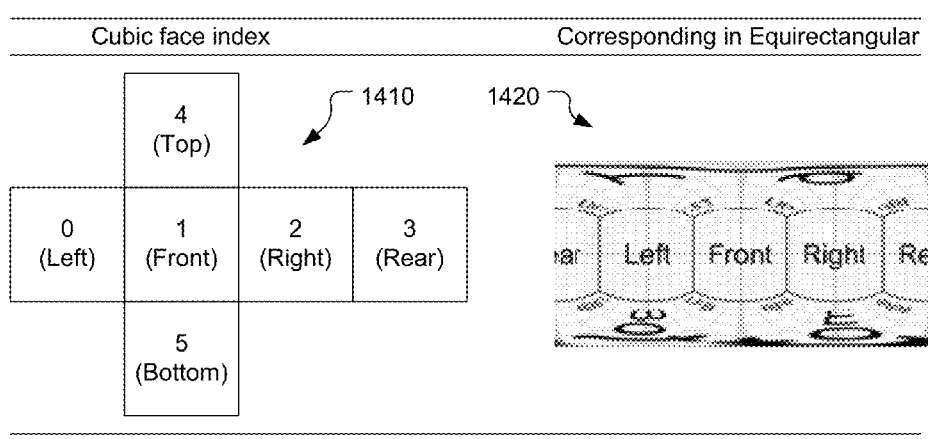
FIG. 14 illustrates an example of the default relative location of cubic faces and their indexes for the cubic face index and corresponding equirectangular.

In another embodiment, the syntax design for the layout signaling includes additional syntax to signal the information of the permutation and rotation of these six cubic faces. The default relative location of cubic faces and their indexes is shown in FIG. 14, where the cubic face index (1410) and corresponding equirectangular (1420) are shown.

An exemplary syntax design according to the above embodiment is shown in Table 19a and Table 19b. In Table 19a, the mapping_extension( ) is defined as indicated by text in Italic. The details of the mapping_extension( ) is shown in Table 19b.

TABLE 19a

| | Descriptor |
|---|---|
| Extension_data(i) { | |
|   While ( next_bits(32) == extension_start_code ) { | |
|     extension_start_code | f(32) |
|     if (i == 0) { | |
|       if (next_bits(4) == '0010') | |
|         sequence_display_extension( ) | |
|       else if ( next_bits(4) == '0011') | |
|         temporal_scalability_extension( ) | |
|       else if ( next_bits(4) == '0100') | |
|         copyright_extension( ) | |
|       else if ( next_bits(4) == '1010') | |
|         mastering_display_and_content_metadata_extension( ) | |
|       else if ( next_bits(4) == '1011') | |
|         camera_parameters_extension( ) | |
|       else if ( next_bits(4) == 'xxxx') | |
|         mapping_extension( ) | |
|       else | |
|         ... | |

TABLE 19b

| | Descriptor |
|---|---|
| mapping_extension() { | |
|   num_of_layout_face_minus1 | ue(v) |
|   for ( i=0; i<num_of_layout_face_minus1; i++) { | |
|     layout_face[i] | ue(v) |
|     layout_rotation[i] | ue(v) |
|   } | |
|   layout_rotation[num_of_layout_face_minus1] | ue(v) |
| } | |

In the above Tables, syntax num_of_layout_face_minus1 specifies the total number of faces in the layout. Syntax num_of_layout_faces is inferred to be num_of_layout_face_minus1 +1. Syntax layout_face[i] specifies the cubic face index as the corresponding face for the i-th position in the layout, and the value of layout_face[i] shall be in the range of 0 to (num_of_layout_face_minus1), inclusive. Syntax layout_face[num_of_layout_face_minus1] is inferred to be qual to the last remaining face. Syntax layout_rotation[i] specifies the corresponding face rotation for the i-th position in the layout as specified in Table 20, and the value of layout_rotation[i] shall be in the range of 0 to 3, inclusive.

TABLE 20

| layout_rotation[i] | rotation degree (counterclockwise) |
|---|---|
| 0 | 0 |
| 1 | −90 |
| 2 | +90 |
| 3 | +180 |

Figure 15:
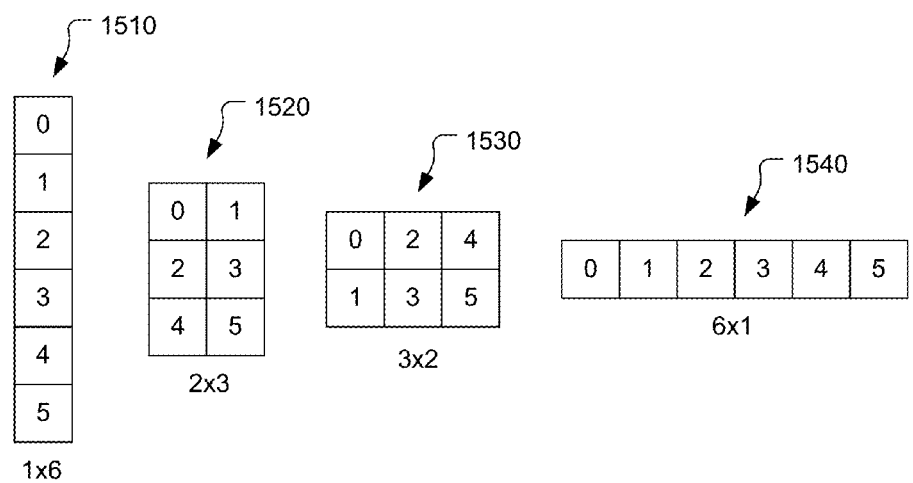
FIG. 15 illustrates an exemplary order of the position in each cubic layout for 1×6 layout, 2×3 layout, 3×2 layout and 6×1 layout.

Another exemplary order of the position in each cubic layout (i.e., layout_face[i]) is shown in FIG. 15 for 1×6 layout (1510), 2×3 layout (1520), 3×2 layout (1530) and 6×1 layout (1540).

Another exemplary syntax design according to the above embodiment is shown in Table 21.

TABLE 21

|  | Descriptor |
|---|---|
| mapping_extension( ) { |  |
|    mapping_format | ue(v) |
|    if (mapping_format == 'CUBICFACE') { |  |
|      cubic_type | ue(v) |
|      default_layout_flag | u(1) |
|      if( !default_layout_flag ) { |  |
|         for ( i=0; i<5; i++) { |  |
|            layout_face[i] | ue(v) |
|            layout_rotation[i] | ue(v) |
|         } |  |
|         layout_rotation [5] | ue(v) |
|      } |  |
|    } |  |
|    else if ( mapping_format == 'EQUIRECTANGULAR') |  |
|      ... |  |
|    else if ( mapping_format == '180-3D') |  |
|      ... |  |
|    else if ( mapping_format == 'CYLINDERMAP') |  |
|      ... |  |
| } |  |

In the above Table, mapping_format specifies the input mapping format of 360-degree video as specified in the following Table, where the value of mapping_format shall be in the range of 0 to 3, inclusive.

TABLE 22

| Value | Description |
|---|---|
| 0 | CUBICFACE |
| 1 | EQUIRECTANGULAR |
| 2 | 180-3D |
| 3 | CYLINDERMAP |

In Table 21, cubic_type specifies the cubic type in the cubic format as specified in Table 23, and the value of cubic_type shall be in the range of 0 to 3, inclusive.

TABLE 23

| Value | Description |
|---|---|
| 0 | 1 × 6 cubic format |
| 1 | 2 × 3 cubic format |

TABLE 23-continued

| Value | Description |
|---|---|
| 2 | 3 × 2 cubic format |
| 3 | 6 × 1 cubic format |

Syntax default_layout_flag equal to 1 indicates that the cubic layout follows the default layout as specified in Table 24. Syntax default_layout_flag equal to 0 indicates that the default cubic layout is not present and the corresponding face and rotation for each position is explicitly signaled. Table 24 specifies the default layout. The corresponding face and rotation for each position in the cubic layout according to the order described in FIG. 12 is specified as follows. The mapping from the equirectangular to the cubic faces is defined in FIG. 11.

TABLE 24

| Cubic_type | Default layout |
|---|---|
| 1 × 6 cubic format | {Left(−90°), Front(−90°), Right(−90°), Top(+180°), Rear(0°), Bottom(+180°)} |
| 2 × 3 cubic format | {Left(−90°), Top(+180°), Front(−90°), Rear(0°), Right(−90°), Bottom(+180°)} |
| 3 × 2 cubic format | {Left(0°), Front(0°), Right(0°), Top(−90°), Rear(+90°), Bottom(−90°)} |
| 6 × 1 cubic format | {Left(0°), Front(0°), Right(0°), Top(−90°), Rear(+90°), Bottom(−90°)} |

In Table 21, layout_face[i] specifies the index in the remaining faces as the corresponding face for the i-th position in the layout. The face and rotation for each position (i.e., layout_face[i] and layout_rotation[i]) according to the order described in FIG. 12 are signaled iteratively as follows. The initial (face-selection) array includes all six faces in the order of {Left, Front, Right, Rear, Top, Bottom}. For the first position, layout_face[0] is signaled to indicate the index of a selected face in the array (i.e., {Left, Front, Right, Rear, Top, Bottom}) as the corresponding face for position 0. The value of layout_face[0] shall be in the range of 0 to 5, inclusive. The selected face for position 0 is removed from the array for remaining candidates afterwards. For the i-th position, layout_face[i] is signaled to indicate index in the updated array composed of the remaining unselected faces as the corresponding face for position i. The value of layout_face[i] shall be in the range of 0 to 5−i, inclusive. The corresponding selected face for position i is removed from the array of remaining candidates afterwards. For the last position, it is inferred to be the last remaining unselected face.

In Table 21, layout_rotation[i] specifies the corresponding face rotation for the i-th position in the layout as specified in Table 20, and the value of layout_rotation[i] shall be in the range of 0 to 3, inclusive.

According to another embodiment, an exemplary syntax design for the layout signaling is shown in Table 25, where additional syntax is signaled for the information of the permutation and rotation of these six cubic faces.

TABLE 25

|  | Descriptor |
|---|---|
| mapping_extension( ) { |  |
|    mapping_format | u(8) |
|    if (mapping_format == 'CUBICFACE') { |  |
|      cubic_type | u(4) |

TABLE 25-continued

| | Descriptor |
|---|---|
| default_layout_flag | u(1) |
| if( !default_layout_flag ) { | |
|     for ( i=0; i<6; i++ ) { | |
|         layout_face[i] | u(3) |
|         layout_rotation[i] | u(2) |
|     } | |
| } | |
| } | |
| else if ( mapping_format == 'EQUIRECTANGULAR') | |
| ... | |
| else if ( mapping_format == '180-3D') | |
| ... | |
| else if ( mapping_format == 'CYLINDERMAP') | |
| ... | |
| } | |

In another embodiment of the present invention, if the cubic face is selected as the layout format, a second flag is transmitted in the sequence level, view level, picture level, slice level, tile level, SPS, VPS, or APS of the bitstream to select one cubic type from a set of cubic types, which includes at least two of 1×6 cubic format, 2×3 cubic format, 3×2 cubic format and 6×1 cubic formats.

In another embodiment, a flag is transmitted in the sequence level, view level, picture level, slice level, tile level, SPS, VPS, or APS of the bitstream to indicate whether a predefined default layout for cubic or other format is used. If the predefined default layout for cubic or other format is not used, the layout is then explicitly transmitted into the bitstream. The predefined layout for cubic face could be defined as Table 24.

Figure 16A:
Figure 16B:
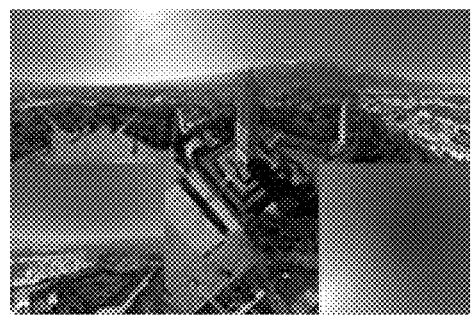
Figure 16C:
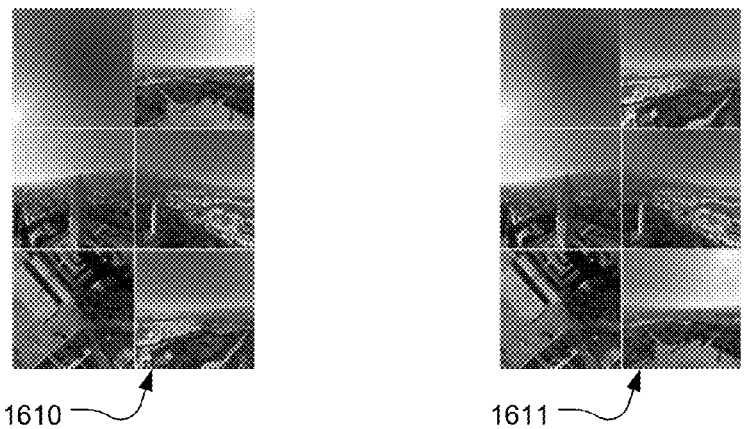
Figure 16D:
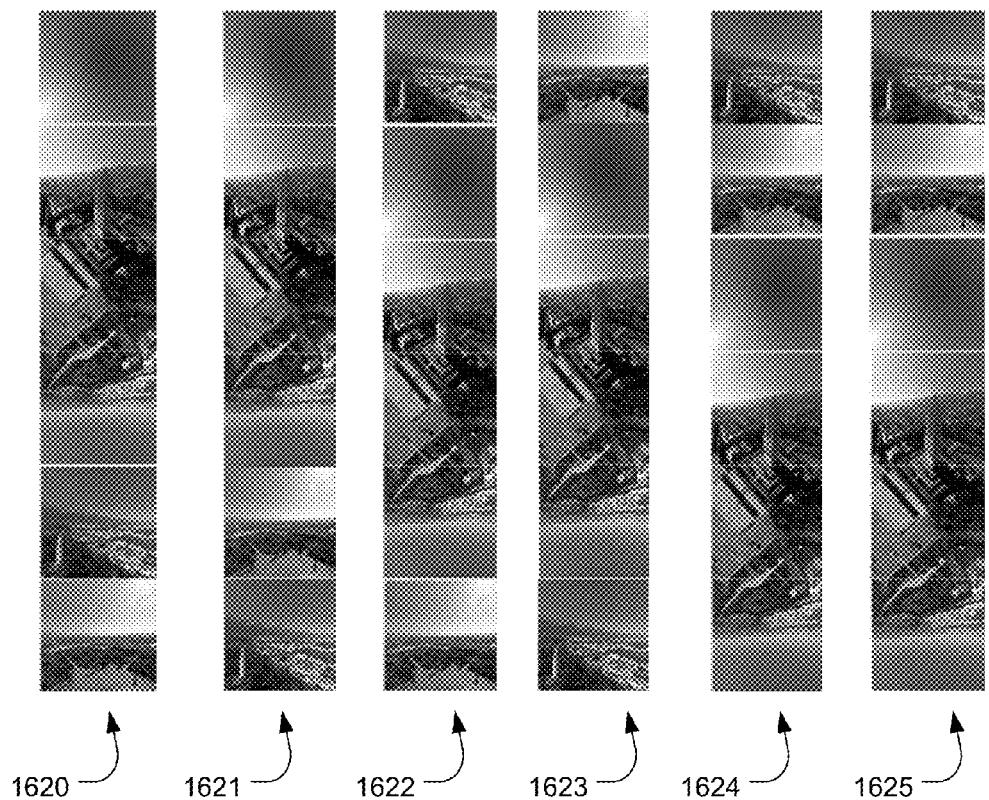

Other predefined layouts may also be used. For example, a different 6×1 cubic layout can also be defined as shown in FIG. 16a. A different 3×2 cubic layout is shown in FIG. 16b. Two different 2×3 cubic layouts (1610 and 1611) are shown in FIG. 16c. Six different 1×6 cubic layouts (1620 to 1625) are shown in FIG. 16d.

To explicitly signal the layout, the corresponding face(s) and/or the rotation(s) associated with each corresponding face are transmitted in the bitstream. In one example, an initial (face-selection) array includes at least two of {Left, Front, Right, Rear, Top, Bottom} with a predefined order is given.

For the first position, a syntax is signaled to indicate the index of a selected face in the given array as the corresponding face for the first position, and the value of the syntax shall be in the range of 0 to (N−1), where N represents the number of total faces.

For the i-th position, another syntax is signaled to indicate the index in the updated array composed of the remaining unselected faces as the corresponding face for position i, and the value of that syntax shall be in the range of 0 to (N−1), inclusive. For the last position, it is inferred to be the last remaining unselected face.

In another example, an initial (face-selection) array includes at least two of {Left, Front, Right, Rear, Top, Bottom} with a predefined order is given.

For the first position, a syntax is signaled to indicate the index of a selected face in the given array as the corresponding face for the first position, and the value of the syntax shall be in the range of 0 to (N−1), where N represents the number of total faces. The selected face for the first position is removed from the array afterwards.

For the i-th position, another syntax is signaled to indicate index in the updated array composed of the remaining unselected faces as the corresponding face for position i, and the value of that syntax shall be in the range of 0 to (N−1−i), inclusive. The corresponding selected face for position i is removed from the array afterwards. For the last position, it is inferred to be the last remaining unselected face.

To specify the corresponding face rotation for each position in the layout, a syntax for each position is transmitted to indicate the corresponding face rotation from a set of rotation candidates which includes at least two of (−90°, +90°, +180°, 0°). The specification of the index of the rotation can be defined as Table 20.

Figure 17:
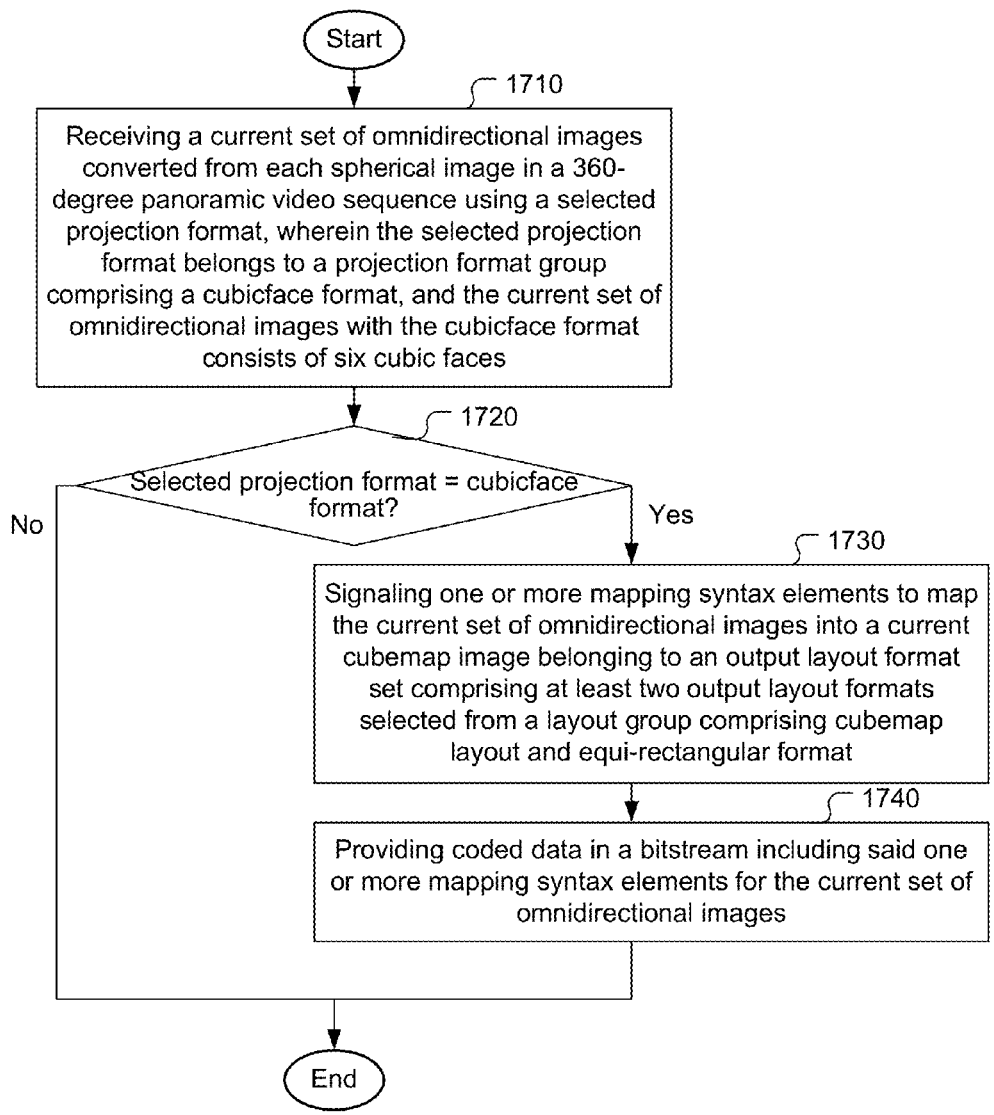
FIG. 17 illustrates an exemplary flowchart of a system processes omnidirectional images according to an embodiment of the present invention.

FIG. 17 illustrates an exemplary flowchart of a system processes omnidirectional images according to an embodiment of the present invention. The steps shown in the flowchart, as well as other flowcharts in this disclosure, may be implemented as program codes executable on one or more processors (e.g., one or more CPUs) at the encoder side and/or the decoder side. The steps shown in the flowchart may also be implemented based on hardware such as one or more electronic devices or processors arranged to perform the steps in the flowchart. According to this method, a current set of omnidirectional images converted from each spherical image in a 360-degree panoramic video sequence using a selected projection format is received in step 1710, where the selected projection format belongs to a projection format group comprising a cubicface format, and the current set of omnidirectional images with the cubicface format consists of six cubic faces. Whether the selected projection format corresponds to the cubicface format is checked in step 1720. If the selected projection format corresponds to the cubicface format, steps 1730 and 1740 are performed. Otherwise (i.e., the "No" path for non- cubicface format), steps 1730 and 1740 are skipped. In step 1730, one or more mapping syntax elements to map the current set of omnidirectional images into a current cubemap image belonging to an output layout format set are signaled, where output layout format set comprises at least two output layout formats selected from a layout group comprising cubemap layout and equi-rectangular format. In step 1740, coded data in a bitstream including said one or more mapping syntax elements are provided for the current set of omnidirectional images.

The flowchart shown above is intended for serving as examples to illustrate embodiments of the present invention. A person skilled in the art may practice the present invention by modifying individual steps, splitting or combining steps with departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention.

The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing omnidirectional images, the method comprising:
   receiving a current set of omnidirectional images converted from each spherical image in a 360-degree panoramic video sequence using a selected projection format, wherein the selected projection format belongs to a projection format group comprising a cubicface format, and the current set of omnidirectional images with the cubicface format consists of six cubic faces; and
   if the selected projection format corresponds to the cubicface format:
   signaling one or more mapping syntax elements to map the current set of omnidirectional images into a current cubemap image belonging to an output layout format set comprising at least two output layout formats selected from a layout group comprising cubemap layout and equirectangular format; and
   providing coded data in a bitstream including said one or more mapping syntax elements for the current set of omnidirectional images.

2. The method of claim 1, wherein the projection format group further comprises a 180-3D format, a cylindermap format, cubemap_32 layout, cubemap_180 layout, plane_poles layout, plane_poles_6 layout, plane_poles_cubemap layout, plane_cubemap layout, plane_cubemap_32 layout, flat_fixed layout, cubemap_1×6 layout, cubemap_2×3 layout, cubemap_3×2 layout and cubmap_6×1 layout.

3. The method of claim 2, wherein if the current set of omnidirectional images is in the equirectangular format, the current set of omnidirectional images is converted into the cubicface format and said one or more mapping syntax elements are signaled for converted current set of omnidirectional images by treating the converted current set of omnidirectional images as having the cubicface format.

4. The method of claim 1, wherein said one or more mapping syntax elements comprise a current cubic type associated with the current cubemap image and the current cubic type belongs to a current output layout format set consisting of 1×6 cubemap layout, 2×3 cubemap layout, 3×2 cubemap layout, and 6×1 cubemap layout.

5. The method of claim 4, wherein said one or more mapping syntax elements further comprise layout mapping indices, wherein each layout mapping index associates one cubic face of the current set of omnidirectional images with one location of the current cubemap image.

6. The method of claim 5, wherein each layout mapping index is coded using a code table with a number of entries equal to a number of cubic faces to be mapped.

7. The method of claim 5, wherein one layout mapping index is signaled for each cubic face of the current set of omnidirectional images except for a last cubic face of the current set of omnidirectional images.

8. The method of claim 7, wherein each layout mapping index is coded using a code table with a number of entries equal to a number of remaining cubic faces to be mapped.

9. The method of claim 5, wherein said one or more mapping syntax elements further comprise rotation indices, wherein each rotation index indicates a rotation angle for one cubic face of the current set of omnidirectional images at said one location of the current cubemap image.

10. The method of claim 9, wherein one rotation index is signaled for each cubic face of the current set of omnidirectional images.

11. The method of claim 10, wherein each rotation index is coded using code table to indicate one rotation angle selected from a rotation angle set corresponding to {0° and 90°}, {0°, +90°, −90° and 180°} or {0°, 90°, 180° and 270°}.

12. The method of claim 9, wherein said one or more mapping syntax elements further comprise a default layout flag to indicate whether a default cubemap image is used for the current set of omnidirectional images with the current cubic type, and wherein the layout mapping indices and the rotation indices are signaled for the current set of omnidirectional images only if the default layout flag indicates that the default cubemap image is not used for the current set of omnidirectional images.

13. The method of claim 9, wherein said one or more mapping syntax elements further comprise a default layout flag to indicate whether a default cubemap image is used for the current set of omnidirectional images with the current cubic type, and wherein default layout mapping indices and default rotation indices are used for the current set of omnidirectional images if the default layout flag indicates that the default cubemap image is used for the current set of omnidirectional images.

14. The method of claim 1, wherein the output layout format set used for the current set of omnidirectional images is signaled at a sequence level, view level, picture level, slice level, sequence parameter set (SPS), video parameter set (VPS), or application parameter set (APS) in a bitstream for the 360-degree panoramic video sequence.

15. The method of claim 1, wherein said one or more mapping syntax elements are signaled at a sequence level, view level, picture level, slice level, sequence parameter set (SPS), video parameter set (VPS), or application parameter set (APS) in the bitstream for the 360-degree panoramic video sequence.

16. The method of claim 1, wherein said one or more mapping syntax elements are signaled predictively based on one or more reference mapping syntax elements.

17. The method of claim 16, wherein multiple sets of one or more reference mapping syntax elements are signaled at a sequence level, view level or picture level in the bitstream for the 360-degree panoramic video sequence and a flag is signaled in a slice level or the picture level to select said one or more mapping syntax elements from the multiple sets of one or more reference mapping syntax elements for the current set of omnidirectional images.

18. The method of claim 16, wherein are one or more reference mapping syntax elements are predicted by one or more first mapping syntax elements from a previous picture, slice or frame.

19. An apparatus for processing omnidirectional images, the apparatus comprising one or more electronic circuits or processors arranged to:
  receive a current set of omnidirectional images converted from each spherical image in a 360-degree panoramic video sequence using a selected projection format, wherein the selected projection format belongs to a projection format group comprising a cubicface format, and the current set of omnidirectional images with the cubicface format consists of six cubic faces; and
  if the selected projection format corresponds to the cubicface format:
  signal one or more mapping syntax elements to map the current set of omnidirectional images into a current cubemap image belonging to an output layout format set comprising at least two output layout formats selected from a layout group comprising cubemap layout, cubemap_32 layout, cubemap_180 layout, plane_poles layout, plane_poles_6 layout, plane_poles_cubemap layout, plane_cubemap layout, plane_cubemap_32 layout, flat_fixed layout, cubemap_1×6 layout, cubemap_2×3 layout, cubemap_3×2 layout and cubmap_6×1 layout; and
  provide coded data in a bitstream including said one or more mapping syntax elements for the current set of omnidirectional images.

* * * * *